Sheet 1, 2 Sheets.

G. P. Gordon.

Printing Press.

No. 2,792. Reissued Oct. 29, 1867

Witnesses
Geo. Gr. Hunt
Alison Turner

Inventor
Geo. P. Gordon

Sheet 2, 2 Sheets

G. P. Gordon.

Printing Press.

No. 2,792. Reissued Oct. 29, 1867.

Witnesses
Geo. W. Hunt
Aaron Turner

Inventor
Geo. P. Gordon.

United States Patent Office.

GEORGE P. GORDON, OF RAHWAY, NEW JERSEY.

*Letters Patent No.* 32,130, *dated April* 23, 1861; *reissue No.* 2,792, *dated October* 29, 1867.

IMPROVEMENT IN PRINTING-PRESSES.

The Schedule referred to in these Letters Patent and making part of the same.

TO ALL WHOM IT MAY CONCERN:

Be it known that I, GEORGE P. GORDON, of Rahway, Essex county, New Jersey, have invented, made, and applied to use certain new and useful Improvements in the construction and operation of Printing-Presses; and I do declare the following to be a full, clear, and correct description of my said invention, reference being had to the accompanying drawings, making part of this specification, and to the letters of reference marked thereon, in which—

Figure 1:
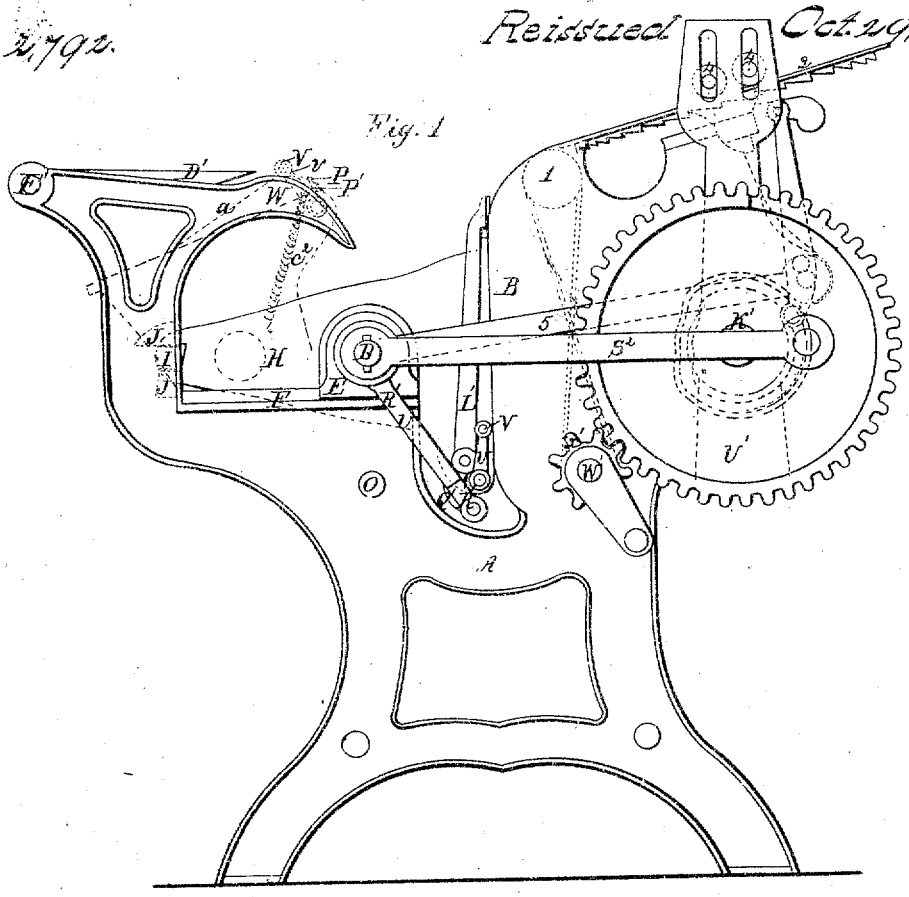

Figure 1 is a side elevation of my improved printing-press.

Figure 2:
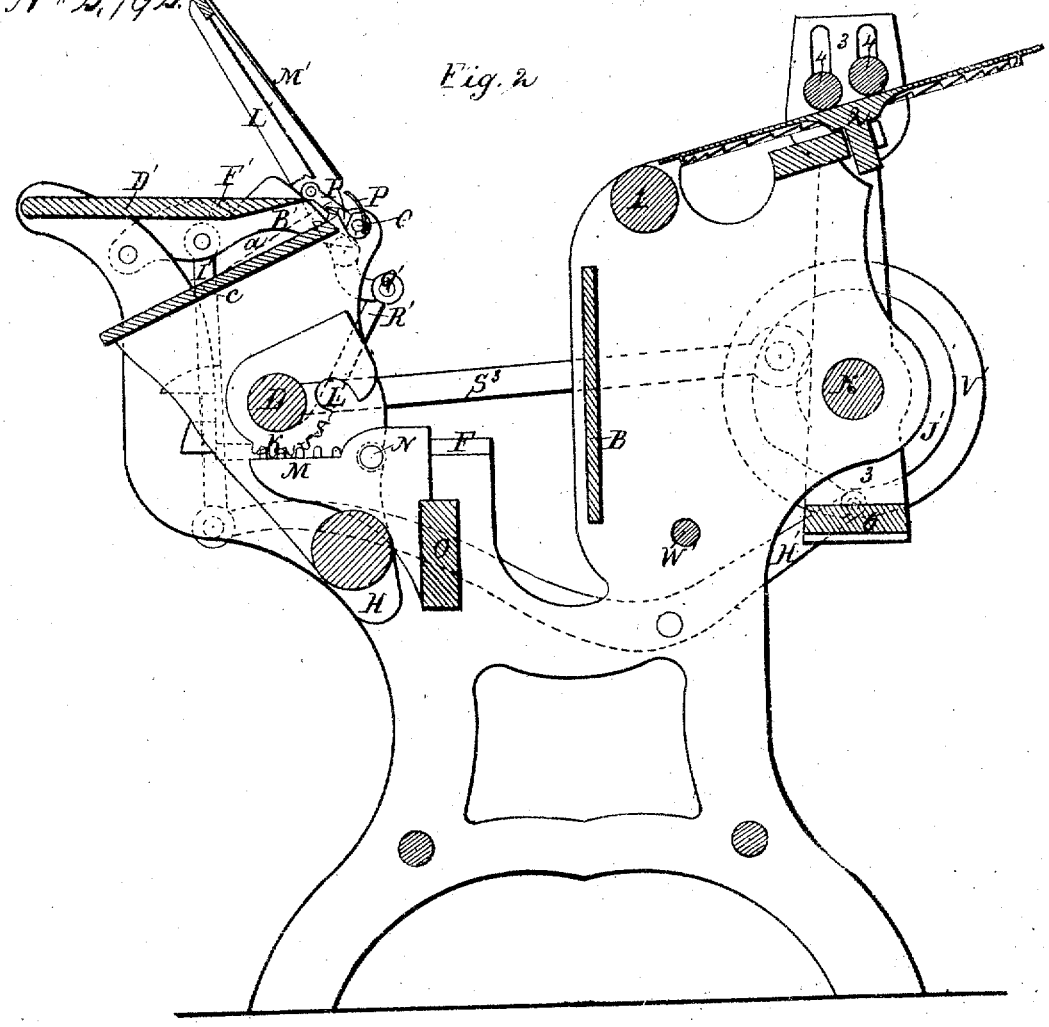

Figure 2, a vertical cut section of the same.

Figure 3:
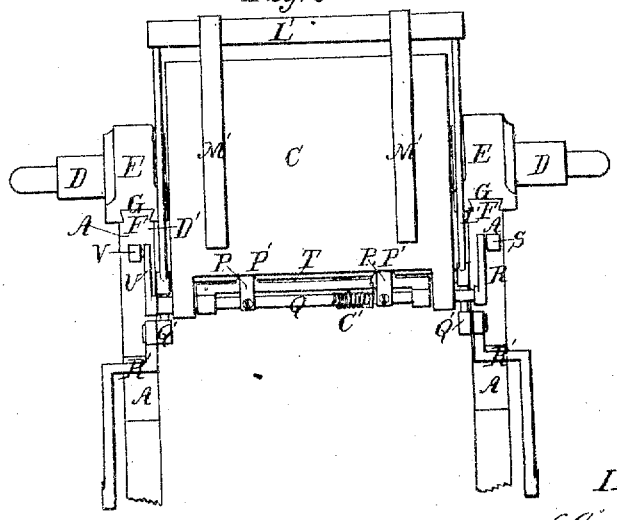

Figure 3, a front view of the platen, showing the nippers and gripers attached to the same.

Figure 4:
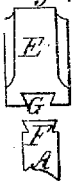

Figure 4, an edge view of the box E and way F.

In the drawings, like parts of the invention are pointed out by the same letters of reference.

The nature of the present invention consists—

(*a.*) In the use of a rocking platen, which shall have a sliding motion imparted to it, and which platen shall turn upward and away from the form, to receive the sheet to be printed, and downward or toward the form, to give an impression.

(*b.*) In combination with such sliding rocking platen, in giving to the same a movement in a direct line to and from the bed.

(*c.*) In combining a sliding rocking platen, having a movement in a direct line to and from the bed, with a bed which shall be stationary at the time of giving an impression.

(*d.*) In the use or employment of the elongations or projections at the back of the platen, having upon them the lugs which fit into the slides or grooves, in combination with the sliding boxes, which hold and carry the shaft upon which the platen rocks.

(*e.*) In attaching the connections directly to the ends of the shaft upon which the platen rocks, in combination with the cranks, for the purposes hereinafter specified.

(*f.*) In combining with a sliding rocking platen a cam and roller, to rock the platen up, to receive the sheet to be printed.

(*g.*) In combining with the same the segment-gear and rack, for the purposes set forth.

(*h.*) In combining the sheet-taking nippers with a rocking platen.

(*i.*) In combining with a rocking platen the sheet-taking nippers and feed-table.

(*j.*) In combining with a rocking platen the sheet-taking nippers, feed-table, and sheet-holding gripers.

(*k.*) In lifting the printed sheet, as hereinafter fully described.

(*l.*) In bringing the face of a rocking platen, beyond the angle at which the sheet is received upon it, to such an angle, inclining towards the operator, that the printed sheet may be relieved, or freely discharged from it, by its own gravity.

To enable those skilled in the arts to make and use my invention, I will proceed to describe the construction and operation of the same.

*Construction.*

A shows a frame for supporting the operating parts of my improved printing-press, and B is the bed upon which are placed the form or types from which an impression is taken. Four screws pass through a back brace, and project into the bed B, and thus hold said bed firmly in position, and serve also to regulate the impression. C is a platen, to receive the sheet to be printed, and carry the same to the bed, in order that an impression may be taken, which platen is supported by and rocks upon the shaft D. This shaft D is supported and moves upon and in the boxes E, which boxes slide upon the ways F. These ways are, in the present instance, dove-tailed and fitted to corresponding recesses G in the boxes E, serving to hold said boxes always firmly in the required position.

Two braces H project from the back of the platen, through which the shaft D runs, said shaft being keyed to the braces H in the desired position. At the back extremities of the braces H are riveted the projecting pieces I, made to slide and fit into the corresponding grooves J, placed on the sides of the frame A, which projecting pieces I and grooves J, in combination with the sliding boxes E, guide the platen in a direct line to and from the bed.

Attached to and firmly bolted to these back braces H are the combined segment-gear K and cam L. This segment-gear and cam work in harmony with the stationary rack M and roller N, attached to a cross-brace, O, and cause and govern the movement of the platen as it slides forward and backward.

The nippers P and P′ are attached to the lower edge of the platen, as shown in fig. 3 of the drawings. These nippers P and P′ move with the platen. The under nippers P′ are made in the form of a yoke, having for its centre the rod Q, upon which are attached the upper nippers P. At one end of this rod is attached a crank-arm, R, with its roller S. At the opposite end of the platen, upon the projecting end of the yoke T, is a similar crank-arm, U, with its roller V. The object of this crank-arm U is, upon the return movement of the platen, to impinge upon the bracket W, and raise the nippers P and P′, with the printed sheet, from the tympan, thus admitting a volume of air between the sheet and the tympan; and, upon the further movement of the platen, the crank-arm R, with its roller S, attached to the rod Q, (upon which rod Q are the upper nippers P,) strikes upon the trip B′, rising upon the same, opening the upper nippers P, and releasing the printed sheet *a*, which sheet, thus released and buoyed up by the air, glides freely from the tympan. $C^1$ is a spring, for the purpose of holding the nippers P and P′ together. $C^2$ is a spring to hold the nippers P and P′ to the tympan or platen C.

The platen has hinged to its lower edge a griper-frame, L′, upon which are placed the gripers M′. This frame L′ may be provided with slots, through which slots bolts pass, and by means of these bolts, with their nuts, the gripers M′ may be held in the desired position, the slots in said frame allowing the gripers to be regulated as may be desired. These gripers are for the purpose of holding the sheet upon and to the tympan, in order that the same may be relieved in a proper manner from the form or types. To the crank-ends Q of the griper-frame L′ are attached the connecting-arms R′. These connecting-arms are attached to the sliding boxes E, and are for the purpose of opening and closing the griper-frame L′ as the platen rocks forward and backward.

D′ shows a vibrating feed-table, upon which the sheet to be printed is placed in order that it (the sheet) may be taken therefrom by the nippers P and P′. This table D′ is supported upon and by the rod E′, upon which it vibrates. It has also attached to it, on one side, a supporting-roller, E′, which roller rests upon the trip B′ in such a manner that the table shall operate in harmony with the closing of the nippers P and P′, so that the sheet, without disturbing its position, when laid against a gauge or gauges, may be taken from the table D′ by the nippers P and P′. Movable gauges are attached to and used in connection with the feed-table, against which gauges the sheet of paper to be printed is laid. B′ is a trip, which operates the feed-table D′, and opens and closes the upper nippers P at the proper time. The trip B′ is operated by the lever H′, and is attached to lever H′ by the connecting-piece I′. This lever H′ is pivoted, at or near its centre, to the frame A, upon the fly-wheel side, and is made to vibrate freely upon said pivot. Said lever H′ receives its motions from or is operated by the cam J′ upon the main shaft K′.

$S^2$ and $S^3$ are crank-connecting rods, attached at one end to the shaft D upon which the platen rocks, and at the other or opposite end to cranks upon the main shaft K′. K′ is the main shaft, on one end of which is the main driving-wheel U′, while upon its opposite end is the blank V′, said driving-wheel U′ and blank V′ forming the cranks, to which are attached the crank-connecting rods $S^2$ and $S^3$. W′ shows a crank-shaft, upon one end of which is the pinion X′, gearing into the main wheel U′, while upon the other end of said shaft may be placed the balance-wheel or pulleys, as required.

Directly over the bed B, and parallel with the face of the form or types, is placed the ink-distributing cylinder 1. This cylinder may be supplied with ink from a fountain in the usual manner. Back of this distributing cylinder 1 is placed a revolving ink-distributing table or disk 2. 3 3 are arms for carrying the rollers 4 forward and backward over the form or types and the distributing-surfaces 1 and 2, as said arms 3 rock or vibrate. Motion is communicated to these roller-arms by the connecting-rod 5, attached at one end to the same, 3, and at the other end to the shaft D. The roller-arms are connected together by a brace, 6, and form, as it were, a frame. The ink-distributing table or disk is made to revolve a given distance for each impression, and the distributing cylinder is made to vibrate, and may be driven by a belt or gearing, as desired.

*Operation.*

We will suppose the form to have been placed upon the bed, and the press ready for operation, the sheet laid upon the feed-table, and the platen, with its nippers, in position to receive the sheet, the roller-arms being at the lowest point of their vibration, the bottom of the bed. Motion being communicated to the press, the cam J′ begins to operate upon the lever H′, and thence, through connecting-piece I′ upon the trip B′, it commences to drop said trip B′, lowering the feed-table and closing the upper nippers upon the sheet, while the sheet is still resting upon the table D′. The trip B′ continuing to drop, the table D′, with the gauges, is caused to fall below the edge of the sheet. The platen then begins to rock towards the form or types, drawing the sheet from the table D′, the crank-arm U, with its roller V, recedes from the bracket W, and the spring $C^2$ causes the nippers P and P′ to be brought into line with the face of the tympan, and the sheet of paper is drawn smoothly upon the tympan. The platen continues its downward movement towards the form or types, closing the gripers M′ upon the sheet, until the face of the platen is brought into a parallel position with the form or types. The platen now moves in a straight direction forward, the projecting pieces I entering the grooves J, and the platen continues moving in a straight direction forward until one impression has been taken.

During the downward movement of the platen, and its straight movement forward, the rollers have been carried up over the form, on and over the distributing-cylinder, from which they receive the ink, and on to the revolving table or disk.

An impression having been taken, the platen recedes from the bed, the projecting pieces slide out of the grooves, the roller N enters the cam L, and the cam L rocks the platen, in its upward or return movement, until the segment-gear gears into the stationary rack, and completes the movement of the platen, bringing the face of the platen into the inclined position necessary for the delivery of the printed sheet.

During this movement of the platen the gripers M′, attached to the griper-frame L′, are released from the sheet, and, as the platen begins to assume the inclined position necessary to the delivery of the printed sheet, the crank-arm U impinges upon the bracket W, raises the nippers P and P′, with the printed sheet, from the tympan, and admits a volume of air between the printed sheet and the tympan. As the platen continues moving towards the inclined position, the crank-arm R, with its roller S, attached to the rod Q, (upon which rod Q are the nippers P,) strikes upon the trip B′, and rises upon the same, by which operation the upper nippers P are opened, and the printed sheet is released from their grasp.

In fig. 1, the red lines show the position of the platen, the crank-arm U, with its roller V, impinging upon the bracket W, with the nippers P and P′, with the printed sheet *a* raised from the tympan previous to the delivery of the said sheet *a*.

In fig. 2, the position of the platen is shown, the crank-arm R and its roller S impinging upon the trip B′, the upper nippers P opened, and the sheet *a* released, for its delivery.

During these movements of the platen the rollers 4 are carried from the ink-distributing table or disk on and over the distributing-cylinder, taking their supply of ink from such cylinder, ink having been previously distributed upon the same and over the form or types, and at the time of the delivery of the printed sheet, as shown, have very nearly reached the lowest point of their vibration.

The succeeding sheet to be printed having been laid, as previously stated, upon the feed-table D′ and against the gauges, is taken from the same by the nippers P and P′, and the operation previously described is repeated.

While it will be observed that in the construction of this press I employ automatic sheet-taking nippers, in combination with a tympan supported by a platen, which platen moves to and from the bed, as described, for the purpose of throwing the tympan, so supported, into an inclined position to deliver the printed sheet, and allow the sheet-taking nippers to seize the succeeding sheet, and, as the platen continues to move from this inclined position, draw the same from the feed-table and lay it smoothly upon the tympan, in order that said sheet may be properly presented to the form or types for the reception of an impression, I do not wish to confine myself to the precise mode shown of carrying my tympan, as I am well aware that a tympan-frame, with automatic sheet-taking nippers attached, could readily be made to operate in the same manner as I operate the platen supporting the tympan; that is to say, the platen might be made to move in a straight line, or be made to vibrate to and from the impression, while the tympan, provided with the sheet-taking nippers, should rock to a direct line with the face of the form or types, and assume an inclined position for the delivery of the printed sheet.

It will also be observed that I raise the double nippers, with the printed sheet in their grasp, free from the tympan, thus disturbing the sheet, and moving it from the position it occupied after it had received the impression, and overcoming the attraction of cohesion caused by such impression, and introducing a volume of air between the printed sheet and the tympan, for the purpose of more effectually delivering the sheet from the inclined tympan, in order that such printed sheet may, with greater celerity and certainty glide over and from the face of such tympan. Now the raising of such nippers might be avoided, and the sheet might be delivered from the tympan, though not so surely or freely, by using either the double nippers, without raising them, or a single nipper, rocking directly from the face of the tympan, and by simply giving a greater inclination to the tympan at the time of the delivery of the printed sheet.

It will further be observed that the sheet, when received upon the platen, is received when the platen is at an angle from the vertical position, as patented by me in my patent of 1851, and I do not intend to confine myself to any precise angle, so long as the sheet shall be received upon the platen when the face of such platen shall be thrown upward and away from the form, thus compelling the platen, as it is moved upward, to move into an angular position. Thus the sheet is received, as already patented by me, upon a platen necessarily having an angular position from the vertical position; and it is immaterial how such sheet may be fed to such platen, whether laid directly by the hand upon the platen, this being the first mode adopted by me in experimenting upon this press, or whether the sheet be taken by nippers and laid upon the platen, the invention being unchanged in either case.

It will also be observed that, for the purpose of relieving the printed sheet from the platen, I move or rock the platen beyond the angle at which it receives the sheet to be printed, rocking the platen into a position towards the operator; and this is done solely for this purpose, as the platen still receives the sheet when at an angle from the vertical position, as patented by me in 1851.

Having thus described my invention, what I claim as new, and desire to secure by Letters Patent, is—

I do not claim a rocking platen, having previously patented the same in 1851; but I do claim such rocking platen, when a sliding motion shall be imparted to it bodily, and such platen shall turn upward and away from the form, to receive the sheet to be printed, and downward or toward the form, for the reception of an impression, whether such platen shall occupy the precise angle shown in receiving the sheet or not.

2. I also claim, after the face of the platen has been rocked down to a position parallel with the face of the form or types, for the proper presentation of the sheet to such form, carrying the platen, in this parallel position, to and from the form.

3. I claim a sliding rocking platen, having a direct movement to and from the bed, in combination with a bed which shall be stationary at the time of giving an impression.

4. I claim the elongations or projections at the back of the platen, having upon them the lugs or their equivalents, which fit into the slides or grooves, or their equivalents, in combination with the sliding boxes or their equivalents, which hold and carry the shaft upon which the platen rocks, for the purpose of causing the rocking platen to move in a direct line to and from the impression.

5. I claim attaching the connections directly to the ends of the shaft of a sliding rocking platen, in combination with the cranks, substantially as shown, for the purpose fully described.

6. I claim combining with a sliding rocking platen a cam and roller, or their equivalent, to rock the platen up to receive the sheet to be printed.

7. In combination with a sliding rocking platen, cam and roller, I claim the use or employment of the segment-gear and rack, for the purposes fully described.

8. I claim combining the sheet-taking nippers with a rocking platen, for the purposes described.

9. I claim combining with a rocking platen the sheet-taking nippers and feed-table, for the purposes specified.

10. I claim combining with a rocking platen the sheet-taking nippers, feed-table, and sheet-holding gripers, for the purpose specified.

11. I claim lifting the printed sheet, substantially as shown, for the purpose specified.

12. I claim bringing the face of a rocking platen beyond the angle at which the sheet is received upon it, to such an angle, inclining towards the operator, that the printed sheet may be relieved or freely discharged from it by its own gravity.

GEO. P. GORDON.

Witnesses:

A. SIDNEY DOANE

A. N. SHERMAN